United States Patent
Bonnell et al.

(10) Patent No.: US 8,566,816 B2
(45) Date of Patent: Oct. 22, 2013

(54) CODE SYNCHRONIZATION

(75) Inventors: Eric W. Bonnell, Boulder, CO (US); Arindam Banerjee, Bangalore (IN)

(73) Assignee: LSI Corporation, San Jose, CA (US)

( * ) Notice: Subject to any disclaimer, the term of this patent is extended or adjusted under 35 U.S.C. 154(b) by 80 days.

(21) Appl. No.: 13/286,990

(22) Filed: Nov. 1, 2011

(65) Prior Publication Data

US 2013/0111456 A1    May 2, 2013

(51) Int. Cl.
  *G06F 9/44*   (2006.01)
(52) U.S. Cl.
  USPC .......................................... 717/170; 717/122
(58) Field of Classification Search
  USPC ................................................ 717/122, 170
  See application file for complete search history.

(56) References Cited

U.S. PATENT DOCUMENTS

| | | |
|---|---|---|
| 6,510,552 B1 | 1/2003 | Benayoun et al. |
| 6,584,559 B1 | 6/2003 | Huh et al. |
| 6,675,258 B1 | 1/2004 | Bramhall et al. |
| 6,836,859 B2 | 12/2004 | Berg et al. |
| 7,328,438 B2 * | 2/2008 | Armstrong et al. ............ 718/100 |
| 7,523,350 B2 * | 4/2009 | Lintz et al. ....................... 714/36 |
| 8,204,969 B2 * | 6/2012 | Carcerano et al. ............. 709/221 |
| 2002/0188934 A1 | 12/2002 | Griffioen et al. |
| 2003/0188303 A1 * | 10/2003 | Barman et al. ................. 717/170 |
| 2005/0120384 A1 * | 6/2005 | Stone et al. .................... 725/132 |
| 2010/0037216 A1 * | 2/2010 | Carcerano et al. ............ 717/173 |

* cited by examiner

*Primary Examiner* — Phillip H Nguyen
(74) *Attorney, Agent, or Firm* — Alexander J. Neudeck; Cochran Freund & Young LLC

(57) ABSTRACT

Disclosed is a system and method that resolves a mismatch between software versions executing on redundant controllers. A mismatch between a first software version executing on a first redundant controller and a second software version executing on a second redundant controller is identified. By comparing software version identifiers associated with the first software version, the second software version, and a stored system software identifier, a preferred software version is selected. The preferred software version is copied from a controller running the preferred software version to the other controllers.

16 Claims, 4 Drawing Sheets

FIG. 3 is a flowchart of selecting a preferred software version.

FIG. 4 is a block diagram of a computer system.

CODE SYNCHRONIZATION

BACKGROUND OF THE INVENTION

Mass storage systems continue to provide increased storage capacities to satisfy user demands. Photo and movie storage, photo and movie sharing, and "cloud" storage are examples of applications that fuel the growth in demand for larger and larger storage systems.

A solution to these increasing demands is the use of arrays of multiple inexpensive disks. These arrays may implement RAID functionality. These arrays may be configured in ways that may provide redundancy and error recovery without any loss of data. These arrays may also be configured to increase read and write performance by allowing data to be read or written simultaneously to multiple disk drives. These arrays may also be configured to allow "hot-swapping" which allows a failed disk or controller to be replaced without interrupting the storage services of the array. Multiple disk storage systems typically utilize one or more controllers that shields the user or host system from the details of managing the storage array. Redundant controllers may also be employed to increase reliability and allow for hot-swapping. The controllers may make the storage array appear as one or more disk drives (or volumes). This is accomplished in spite of the fact that the data (or redundant data) for a particular volume may be spread across multiple disk drives.

SUMMARY OF THE INVENTION

An embodiment of the invention may therefore comprise a method of resolving a mismatch between software versions executing on redundant disk array controllers, comprising: identifying a mismatch between a first software version executing on a first redundant controller and a second software version executing on a second redundant controller; determining, by comparing a first software version identifier associated with said first software version and a second software version identifier associated with said second software version with a system software version identifier, that said first software version executing on said first redundant controller is a preferred software version; and, copying said first software version executing on said first redundant controller from said first redundant controller to said second redundant controller.

An embodiment of the invention may therefore further comprise a storage system comprising: a first redundant controller that executes a first software version; a second redundant controller that executes a second software version; and, nonvolatile storage that stores a system software version identifier, said storage system determining that a first software version identifier associated with said first software version and a second software version identifier associated with said second software version do not match said system software version identifier, said storage system determining that said first software version executing on said first redundant controller is a preferred software version, and said storage system copying said first software version executing on said first redundant controller from said first redundant controller to said second redundant controller.

DETAILED DESCRIPTION OF THE EMBODIMENTS

Figure 1:
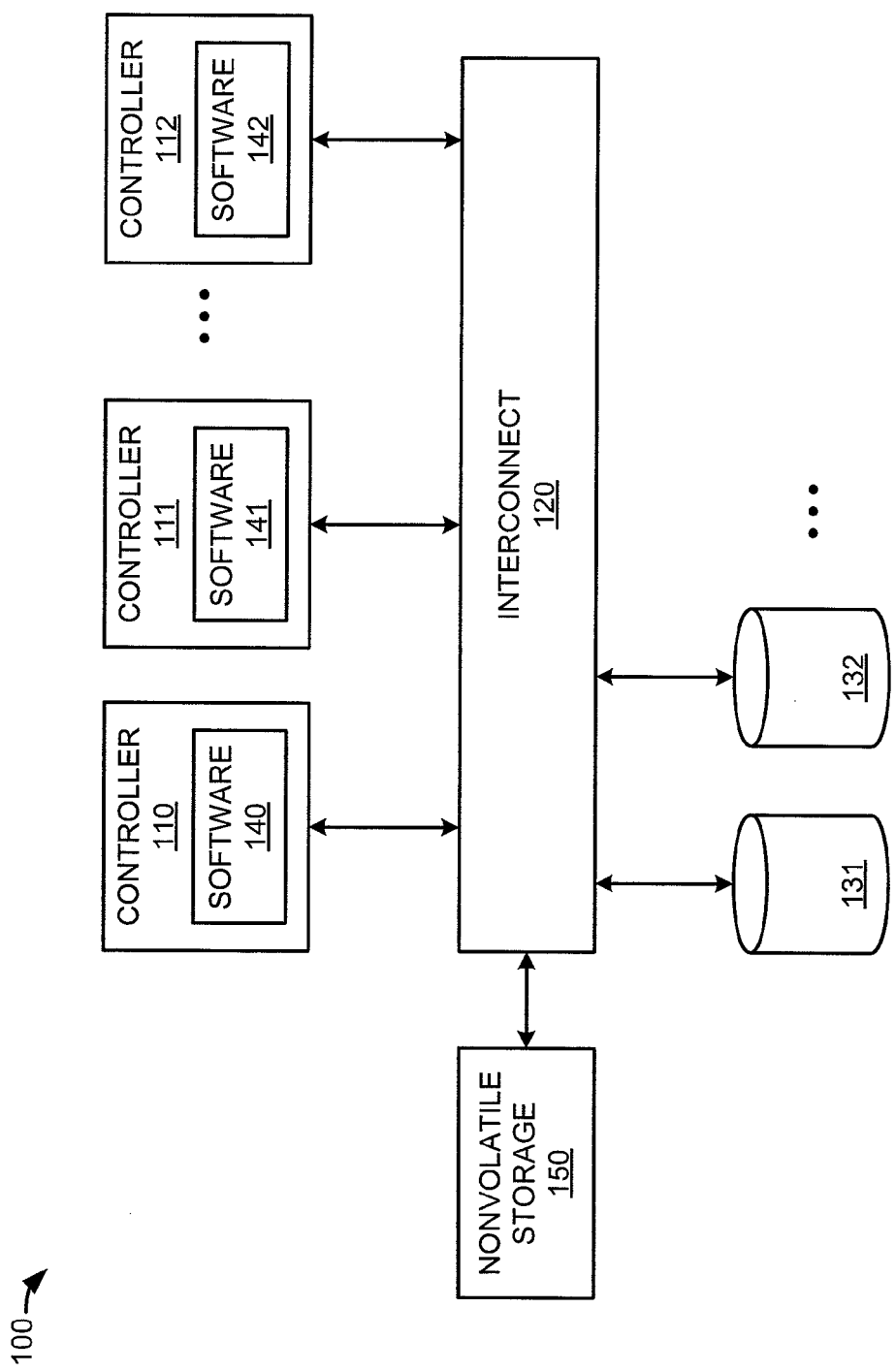
FIG. 1 is a block diagram of a storage system.

FIG. 1 is a block diagram of a storage system. In FIG. 1, storage system 100 comprises a plurality of controllers 110-112, a plurality of disk drives 131-132, interconnect 120, and nonvolatile storage 150. Controller 110 includes, and executes, software 140. Controller 111 includes, and executes, software 141. Controller 112 includes, and executes, software 142. Controllers 110-112 are operatively coupled to interconnect 120. Disk drives 131-132 are operatively coupled to interconnect 120. Nonvolatile storage 150 is operatively coupled to interconnect 120. Thus, plurality of controllers 110-112, plurality of disk drives 131-132, and nonvolatile storage 150 may all be operatively coupled to each other via interconnect 120.

Interconnect 120 may be any backplane, enclosure, cables, links, conductors, network or collection of networks that couple, link, or otherwise operatively connect plurality of controllers 110-112, plurality of disk drives 131-132, and nonvolatile storage 150 with each other and other devices or systems. Interconnect 120 may include other secondary data networks or backplanes. In an example, Interconnect 120 may include a backhaul network, a local network, a long distance network, a packet network, the internet, or any combination thereof, as well as other types of networks. Thus, storage system 100 may be, or be referred to as external storage, internal storage, DAS, RAID, NAS, or SAN.

In an embodiment, plurality of controllers 110-112 may operate redundantly. That is, each of the plurality of controllers 110-112 are intended to be executing the same version of software 140-142 and thus each is to provide redundant functionality relative to other peer controllers 110-112. Thus, any single controller 110-112 is designed to be able to operate storage system 100 independently in the event that one or more peer controllers 110-112 have failed in some way.

In an embodiment, in the event of a controller 110-112 failure, a replacement can be inserted in its place. When a replacement controller 110-112 is inserted into storage system 100, the version of software 140-142 may not match the version of software 140-142 (e.g., the version of software 140 running on controller 110 may not match the version of software 142 running on controller 112). Another scenario that can introduce a mismatch between, for example, software 140 and software 141 is when a device storing one or more of software 140 or software 141 is replaced. In these cases, storage system 100 may determine which version of software 140-142 or 141 is preferable. After determining which version of software 140-142 is preferable, storage system 100 may copy that version from the controller 110-112 with the preferable software 140-142 to the controllers 140-142 with a less preferable version(s).

When controllers 110-112 are executing matched software versions (i.e., software 140, software 141, and software 142 are all the same version), storage system 100 stores a software version identifier (e.g., version string or version number(s)) to nonvolatile storage 150. This version identifier stored in nonvolatile memory may be referred to as the system software version identifier or system version identifier.

Through one of the scenarios described herein, or some other circumstance, a version of software 140-142, or the version of software associated with the system version identifier stored in nonvolatile memory 150 may become mismatched with one or more of each other. In this case, storage system 100 identifies there is a mismatch between at least two of the versions of software 140-142, or the version of software associated with the system version identifier. This mismatch may be detected by comparing version identifiers associated with software 140-142 with each other and/or the system version identifier.

When a mismatch has been identified, storage system 100 may determine which of software 140-142 executing on a controller 110-112 and is a preferred software version. Storage system 100 may determine which of software 140-142 is a preferred software version by comparing software version identifiers associated with the version of software 140-142 and/or the system software version identifier. Using the results of these comparisons, storage system 100 may select a preferred version according to the logic given in Table 1.

TABLE 11

1. An executing software version which is an exact match to the system version (as determined by the system software version identifier and the software version identifiers associated with software 140-142) is preferred over any software version which is not an exact match to the system version. [An exact match is determined when all of the characters in the executing software version identifier matches with the system software version identifier.]
2. An executing software version which is similar to the system version is preferred over any version that is dissimilar to the system version. Similarity is determined by comparing a most significant portion (e.g., a number of bits, number of characters, characters separated by a delimiter, etc.) of the software version identifiers. Note that not all of the system software version identifier string may match an executing software version identifier or else #1, above, would apply.
3. When all of the executing software versions are similar (that is, all of their version identifiers are the same for a specified most significant portion), the version with the version identifier(s) that indicates the most recent version of the software is selected as the preferred version.
4. When all of the executing software versions are dissimilar, the system should not be allowed to continue running. Dissimilarity is determined when a selected most significant portion of the software identifier (e.g., major revision number) is not the same as the system software version identifier.

To further illustrate this logic, consider the following examples. In the following examples, software version identifiers are of the form "M.N.S.P", where: M is a major software revision number; N is a minor software revision number; S is a sub-minor revision number; and P is a sub-sub minor revision number.

For a first example, consider a case where the system software version identifier is A.B.C.D; software 140 has a version identifier of A.B.C.E; software 141 has a version identifier of A.B.C.D; and, software 142 has a version identifier of F.B.C.D. Thus, it should be noted that in this first example, the software versions are not matched, and thus a preferable version needs to be selected for copying to the other controllers in order to synchronize the executing software versions. As can be seen, software 140 is a similar version (because the major software number matches the major software number of the system software version identifier). Software 141 is an exact version. And software 142 is a dissimilar version (because the major software number does not match the major software number of the system software version identifier). Thus, following the logic given in Table 1, and rule #1 in Table 1, in particular, the software 141 running on controller 111 would be copied to controller 110 and controller 112 (and thereby replace the versions of software 140 and software 142 with the A.B.C.D version).

For a second example, consider a case where the system software version identifier is A.B.C.D; software 140 has a version identifier of A.B.C.E; software 141 has a version identifier of A.B.C.E; and, software 142 has a version identifier of F.B.C.E. Thus, it should be noted that in this second example, the software versions are not matched, and thus a preferable version needs to be selected for copying to the other controllers in order to synchronize the executing software versions. As can be seen, software 140 and software 141 are similar versions (because the major software number matches the major software number of the system software version identifier). And software 142 is a dissimilar version (because the major software number does not match the major software number of the system software version identifier). Thus, following the logic given in Table 1, and rule #2 in Table 1, in particular, the software 140 or software 141 may be copied to controller 112 (and thereby replace the version of software 142 with the A.B.C.E version). Also, the system software version identifier would be rewritten with the value A.B.C.E to reflect the fact that all of the controllers 110-112 would now be executing the A.B.C.E version.

For a third example, consider a case where the system software version identifier is A.B.C.D; software 140 has a version identifier of A.B.C.E; software 141 has a version identifier of A.B.C.F; and, software 142 has a version identifier of A.B.C.E. In this example, a sub-sub minor revision number of "F" is consider newer than sub-sub minor revision number of "E". In this third example, as in the previous examples, the software versions are not matched, and thus a preferable version needs to be selected for copying to the other controllers in order to synchronize the executing software versions. Software 140-142 are all similar versions (because the major software number matches the major software number of the system software version identifier). Thus, following the logic given in Table 1, and rule #3 in Table 1, in particular, the software 141 running on controller 111 should be copied to controller 110 and controller 112 (and thereby replace the version of software 140 and software 142 with the A.B.C.F version) because a sub-sub minor revision number of "F" is considered newer than sub-sub minor revision number of "E". Also, the system software version identifier would be rewritten with the value A.B.C.F to reflect the fact that all of the controllers 110-112 would now be executing the A.B.C.F version.

For a fourth example, consider a case where the system software version identifier is A.B.C.D; software 140 has a version identifier of F.B.C.E; software 141 has a version identifier of F.B.C.G; and, software 142 has a version identifier of F.B.C.H. In this fourth example, as in the previous examples, the software versions are not matched, and thus a preferable version needs to be selected for copying to the other controllers in order to synchronize the executing software versions. Software 140-142 are all dissimilar versions (because none of the major software numbers matches the major software number of the system software version identifier). Thus, following the logic given in Table 1, and rule #4 in Table 1, in particular, storage system 100 should stop software 140-142 from running and give an indication that manual intervention is requested.

In an embodiment, storage system 100 may only have two controllers (i.e., controller 110 and controller 111). In this embodiment, each controller 110-112 may take action according to the following Table 2 in order to ensure software 140 and software 141 are running a common software version. Table 2 discloses the logic from the perspective of controller 110. However, it should be understood that the logic applies equally to the decisions and actions to be taken by controller 111.

| Rule # | Software 140 version identifier comparison with system software version identifier | Software 141 version identifier comparison with system software version identifier | Software 140 version comparison to software 141 | Action |
|---|---|---|---|---|
| 1 | Exact | Exact | 140 == 141 | None |
| 2 | Exact | Similar | 140 newer than 141 | Overwrite 141 with 140 |
| 3 | Exact | Similar | 141 newer than 140 | Overwrite 141 with 140 |
| 4 | Exact | Dissimilar | 140 ≠ 141 | Overwrite 141 with 140 |
| 5 | Similar | Similar | 140 newer than 141 | Overwrite 141 with 140 |
| 6 | Similar | Similar | 140 == 141 | None |
| 7 | Similar | Dissimilar | 140 ≠ 141 | Overwrite 141 with 140 |
| 8 | Dissimilar | Dissimilar | 140 == 141 | Stop controllers from executing 140 or 141 |
| 9 | Dissimilar | Dissimilar | 140141 | Stop controllers from executing 140 or 141 |
| 10 | Unknown | Unknown | 140 == 141 | None |
| 11 | Unknown | Unknown | 140 ≠ 141 | None |

Figure 2:
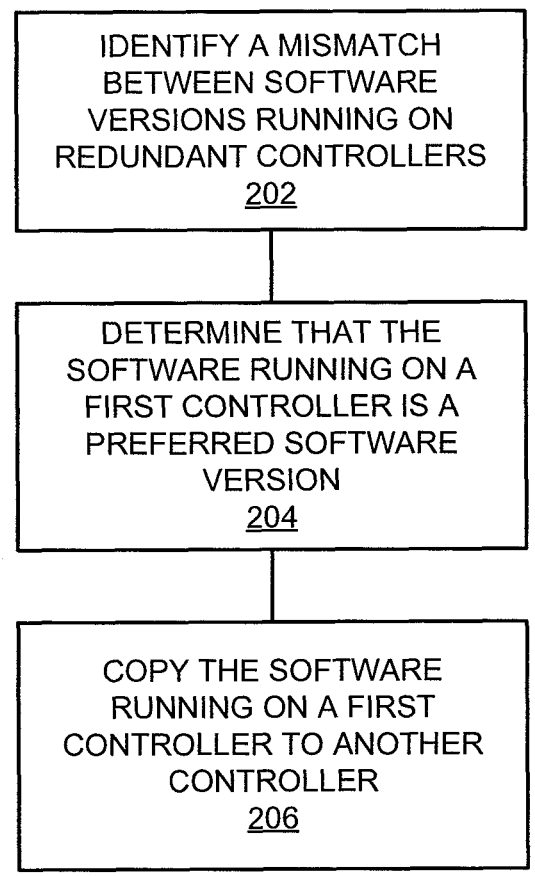
FIG. 2 is a flowchart of a method of resolving a mismatch between software versions executing on redundant controllers.

FIG. 2 is a flowchart of a method of resolving a mismatch between software versions executing on redundant controllers. The steps illustrated in FIG. 2 may be performed by one or more of the elements of storage system 100. A mismatch between software versions running on redundant controllers is identified (202). For example, storage system 100 may detect that the version identifiers of software 140-142 and/or the system software version identifier stored in nonvolatile storage 150 are not all equal to each other. The software running on a first controller is determined to be a preferred software version (204). For example, storage system 100 may determine that the software 140 running on controller 110 is a preferred software version. Storage system 100 may make this determination as described previously. Storage system 100 may make this determination using the rules described in Table 1 and/or Table 2. The software running on the first controller is copied to another controller (206). For example, software 140 running on controller 110 may be copied to controller 111 and/or controller 112. This copy may overwrite software 141 and/or software 142.

Figure 3:
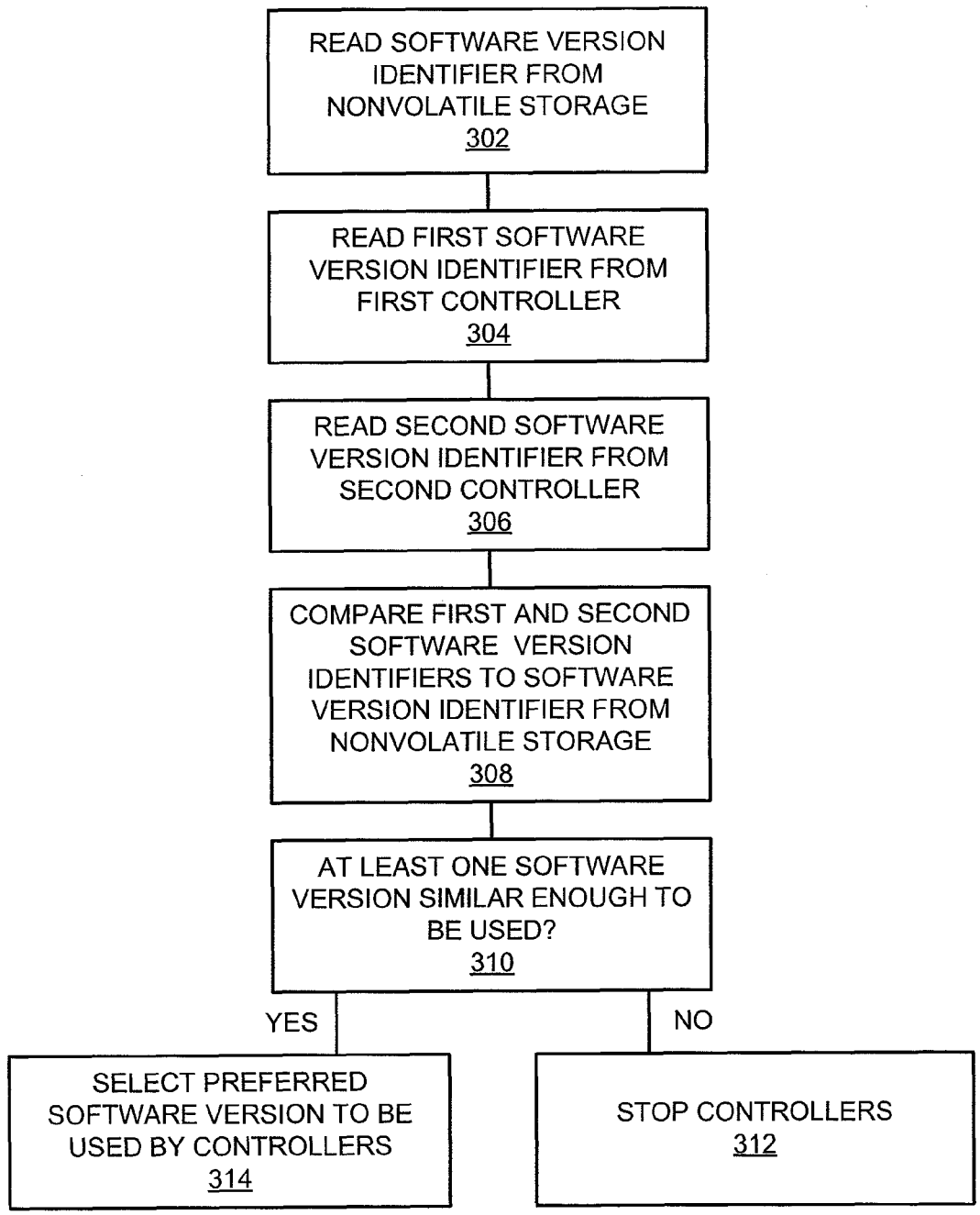

FIG. 3 is a flowchart of selecting a preferred software version. The steps illustrated in FIG. 3 may be performed by one or more of the elements of storage system 100 (including any of controllers 110-112). A software version is read from nonvolatile storage (302). For example, storage system 100 may read the system software version identifier from nonvolatile storage 150. A first software version identifier is read from a first controller (304). For example, storage system 100 may read the version identifier associated with software 140. A second software version identifier is read from a second controller (306). For example, storage system 100 (or any of controllers 110-112) may read the version identifier associated with software 141.

The first and second software version identifiers are compared with the software version identifier from nonvolatile storage (308). For example, storage system 100 may compare the version identifiers associated with software 140, software 141, and the system software version identifier to each other to determine if they are exact, similar, or dissimilar.

If at least one of the software versions is similar enough to be used, flow proceeds to box 314. If none of the software versions is similar enough (i.e., they are all dissimilar to the system software version identifier), flow proceeds to box 312. In box 312, the controllers are stopped from running the dissimilar software versions. In box 314, a preferred software version is selected to be used by the controllers. For example, storage system 100 select a preferred version of the software to be used by the controllers 110-112 using the rules described in Table 1 and/or Table 2.

The methods, systems, networks, devices, equipment, and functions described above may be implemented with or executed by one or more computer systems. The methods described above may also be stored on a computer readable medium. Many of the elements of storage system 100, may be, comprise, or include computers systems. This includes, but is not limited to controller 110, controller 111, controller 112, interconnect 120, disk drives 131-132, and nonvolatile storage 150.

Figure 4:
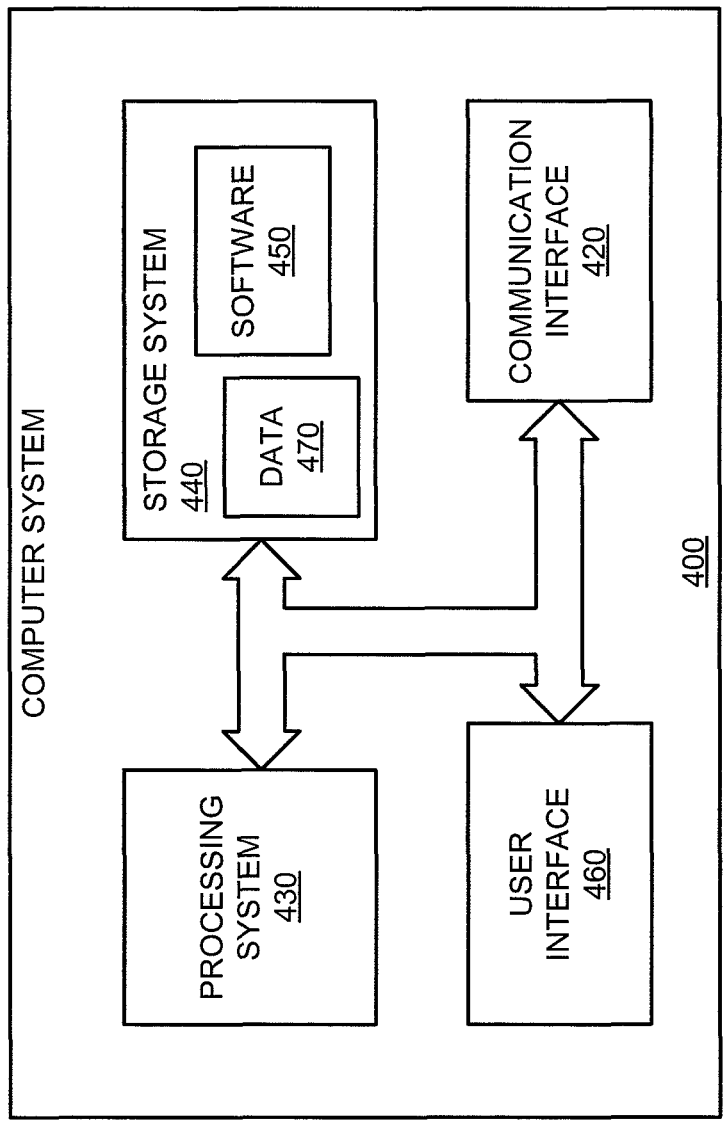

FIG. 4 illustrates a block diagram of a computer system. Computer system 400 includes communication interface 420, processing system 430, storage system 440, and user interface 460. Processing system 430 is operatively coupled to storage system 440. Storage system 440 stores software 450 and data 470. Processing system 430 is operatively coupled to communication interface 420 and user interface 460. Computer system 400 may comprise a programmed general-purpose computer. Computer system 400 may include a microprocessor. Computer system 400 may comprise programmable or special purpose circuitry. Computer system 400 may be distributed among multiple devices, processors, storage, and/or interfaces that together comprise elements 420-470.

Communication interface 420 may comprise a network interface, modem, port, bus, link, transceiver, or other communication device. Communication interface 420 may be distributed among multiple communication devices. Processing system 430 may comprise a microprocessor, microcontroller, logic circuit, or other processing device. Processing system 430 may be distributed among multiple processing devices. User interface 460 may comprise a keyboard, mouse, voice recognition interface, microphone and speakers, graphical display, touch screen, or other type of user interface device. User interface 460 may be distributed among multiple interface devices. Storage system 440 may comprise a disk, tape, integrated circuit, RAM, ROM, network storage, server, or other memory function. Storage system 440 may be a computer readable medium. Storage system 440 may be distributed among multiple memory devices.

Processing system 430 retrieves and executes software 450 from storage system 440. Processing system 430 may retrieve and store data 470. Processing system 430 may also retrieve and store data via communication interface 420. Processing system 430 may create or modify software 450 or data 470 to achieve a tangible result. Processing system 430 may control communication interface 420 or user interface 460 to achieve a tangible result. Processing system 430 may retrieve and execute remotely stored software via communication interface 420.

Software 450 and remotely stored software may comprise an operating system, utilities, drivers, networking software, and other software typically executed by a computer system. Software 450 may comprise an application program, applet, firmware, or other form of machine-readable processing instructions typically executed by a computer system. When executed by processing system 430, software 450 or remotely stored software may direct computer system 400 to operate as described herein.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of resolving a mismatch between software versions executing on redundant disk array controllers, comprising:
   identifying a first mismatch between a first software version executing on a first redundant controller and a second software version executing on a second redundant controller;
   determining, by comparing a first software version identifier associated with said first software version and a second software version identifier associated with said second software version with a system software version identifier, that said first software version executing on said first redundant controller is a preferred software version; and,
   copying said first software version executing on said first redundant controller from said first redundant controller to said second redundant controller;
   wherein determining that said first software version executing on said first redundant controller is said preferred software version further comprises:
     determining a first most significant portion of said first software version identifier matches a corresponding first most significant portion of said system software version identifier;
     determining a second most significant portion of said second software version identifier matches a corresponding second most significant portion of said system software version identifier; and,
     determining that said corresponding first most significant portion is a greater portion of said system software version identifier than said corresponding second most significant portion.

2. The method of claim 1, further comprising:
   after copying said first software version executing on said first redundant controller from said first redundant controller to said second redundant controller, executing said first software version on said second redundant controller.

3. The method of claim 1, further comprising:
   identifying a second mismatch between the first software version executing on the first redundant controller and a third software version executing on a third redundant controller; and,
   determining, by comparing the first software version identifier associated with said first software version and a third software version identifier associated with said third software version with the system software version identifier, that said first software version executing on said first redundant controller is preferred over the third software version.

4. The method of claim 3, wherein determining that said first software version is preferred over the third software version further comprises:
   determining the first most significant portion of said first software version identifier and the first most significant portion of said third software version identifier match the corresponding first most significant portion of said system software version identifier;
   determining that said first software version is more recent than said third software version.

5. The method of claim 3, wherein determining that said first software version is preferred over the third software version further comprises:
   determining the most significant portion of said third software version identifier does not match the corresponding most significant portion of said system software version identifier.

6. The method of claim 3, further comprising:
   determining the first most significant portion of said first software version identifier does not match the corresponding first most significant portion of said system software version identifier;
   determining the second most significant portion of said third software version identifier does not match the corresponding second most significant portion of said system software version identifier; and,
   in response to determining the first most significant portion of said first software version identifier does not match the corresponding first most significant portion of said system software version identifier and to determining the second most significant portion of said third software version identifier does not match the corresponding second most significant portion of said system software version identifier, stopping said execution of said first software version on said first redundant controller, stopping said execution of said second software version on said second redundant controller, and stopping said execution of said third software version on said third redundant controller.

7. A storage system comprising:
   a first redundant controller that executes a first software version;
   a second redundant controller that executes a second software version; and,
   nonvolatile storage that stores a system software version identifier, said storage system determining that a first software version identifier associated with said first software version and a second software version identifier associated with said second software version do not match said system software version identifier, said storage system determining that said first software version executing on said first redundant controller is a preferred software version, and said storage system copying said first software version executing on said first redundant controller from said first redundant controller to said second redundant controller;
   wherein said storage system determines that said first software version executing on said first redundant controller is said preferred software version by: (a) determining a first most significant portion of said first software version identifier matches a corresponding first most significant portion of said system software version identifier, (b) determining a second most significant portion of said second software version identifier matches a corresponding second most significant portion of said system software version identifier, and (c) determining that said corresponding first most significant portion is a greater portion of said system software version identifier than said corresponding second most significant portion.

8. The storage system of claim 7, wherein after said first software version executing on said first redundant controller is copied from said first redundant controller to said second redundant controller, said first software version is executed on said second redundant controller.

9. The storage system of claim 7, wherein said storage system determines that the first software version identifier associated with said first software version and a third software version identifier associated with said third software version do not match said system software version identifier, said storage system determining that said first software version executing on said first redundant controller is preferred over the third software version.

10. The storage system of claim 9, wherein said storage system determines that said first software version is preferred over the third software version by: determining that said first software version is more recent than said third software version.

11. The storage system of claim 9, wherein said storage system determines that said first software version is preferred over the third software version by determining the most significant portion of said third software version identifier does not match the corresponding most significant portion of said system software version identifier.

12. The storage system of claim 9, wherein said storage system determines a first most significant portion of said first software version identifier does not match a corresponding first most significant portion of said system software version identifier, determines a second most significant portion of said second software version identifier does not match a corresponding second most significant portion of said system software version identifier, and in response to determining a first most significant portion of said first software version identifier does not match a corresponding first most significant portion of said system software version identifier and to determining a second most significant portion of said second software version identifier does not match a corresponding second most significant portion of said system software version identifier, stops said execution of said first software version on said first redundant controller, stops said execution of said second software version on said second redundant controller, and stops said execution of said third software version on said third redundant controller.

13. A non-transitory computer readable medium having instructions stored thereon for resolving a mismatch between software versions executing on redundant controllers that, when executed by a computer, at least instruct the computer to:
  identify a mismatch between a first software version executing on a first redundant controller and a second software version executing on a second redundant controller;
  determine, by comparing a first software version identifier associated with said first software version and a second software version identifier associated with said second software version with a system software version identifier, that said first software version executing on said first redundant controller is a preferred software version; and,
  copy said first software version executing on said first redundant controller from said first redundant controller to said second redundant controller;
  wherein to determine that said first software version executing on said first redundant controller is said preferred software version the computer is further instructed to:
    determine a first most significant portion of said first software version identifier matches a corresponding first most significant portion of said system software version identifier;
    determine a second most significant portion of said second software version identifier matches a corresponding second most significant portion of said system software version identifier; and,
    determine that said corresponding first most significant portion is a greater portion of said system software version identifier than said corresponding second most significant portion.

14. The non-transitory computer readable medium of claim 13, wherein said computer is further instructed to:
  after copying said first software version executing on said first redundant controller from said first redundant controller to said second redundant controller, execute said first software version on said second redundant controller.

15. The non-transitory computer readable medium of claim 13, wherein the computer is further instructed to:
  identify a mismatch between the first software version executing on the first redundant controller and a third software version executing on a third redundant controller.

16. The non-transitory computer readable medium of claim 15, wherein the computer is further instructed to:
  determine, by comparing the first software version identifier associated with said first software version and a third software version identifier associated with said third software version with the system software version identifier, that said first software version executing on said first redundant controller is preferred over the third software version.

* * * * *